(12) United States Patent
Pham et al.

(10) Patent No.: US 12,052,391 B2
(45) Date of Patent: Jul. 30, 2024

(54) METHODS AND SYSTEMS FOR AUTOMATIC QUEUING IN CONFERENCE CALLS

(71) Applicant: Capital One Services, LLC, McLean, VA (US)

(72) Inventors: Vincent Pham, Chicago, IL (US); Jeremy Goodsitt, Champaign, IL (US); Kate Key, Effingham, IL (US); Anh Truong, Champaign, IL (US); Austin Walters, Savoy, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/083,241

(22) Filed: Oct. 28, 2020

(65) Prior Publication Data

US 2022/0131979 A1   Apr. 28, 2022

(51) Int. Cl.
| | | |
|---|---|---|
| *H04M 3/56* | (2006.01) | |
| *G06F 3/16* | (2006.01) | |
| *G10L 17/02* | (2013.01) | |
| *G10L 17/18* | (2013.01) | |
| *G10L 17/22* | (2013.01) | |

(52) U.S. Cl.
CPC ............ *H04M 3/566* (2013.01); *G06F 3/165* (2013.01); *G06F 3/167* (2013.01); *G10L 17/02* (2013.01); *G10L 17/18* (2013.01); *G10L 17/22* (2013.01)

(58) Field of Classification Search
CPC ........ H04M 3/566; G06F 3/165; G06F 3/167; G06F 9/542; G10L 17/02; G10L 17/18; G10L 17/22; H04L 65/403; H04L 65/605; H04L 12/1822; H04L 65/601; H04R 3/04; H04R 2430/01
See application file for complete search history.

(56) References Cited

U.S. PATENT DOCUMENTS

| | | | |
|---|---|---|---|
| 5,889,764 | A | 3/1999 | Needham et al. |
| 6,882,971 | B2 | 4/2005 | Craner |
| 7,676,034 | B1 | 3/2010 | Wu et al. |
| 8,370,142 | B2 | 2/2013 | Frankel et al. |
| 9,900,436 | B2 | 2/2018 | Raanani et al. |

(Continued)

OTHER PUBLICATIONS

"Discord Queue Bot" <https://top.gg/bot/679018301543677959> (Retrieved Oct. 28, 2020).

(Continued)

*Primary Examiner* — Phung-Hoang J Nguyen
(74) *Attorney, Agent, or Firm* — Bookoff McAndrews, PLLC (57) ABSTRACT

Disclosed are methods, systems, and non-transitory computer-readable medium for automatically queuing participants during a conference call. For instance, the method may include receiving call data associated with a conference call; analyzing the call data to identify the participants on the conference call; and determining whether two or more participants of the plurality of participants are speaking at a same time. The method can also include tracking a first participant that continues speaking and a second participant that stops speaking; and displaying a queuing element on a graphical user interface (GUI) to indicate that the second participant is in a queue to speak once the first participant has finished speaking.

20 Claims, 7 Drawing Sheets

(56) References Cited

U.S. PATENT DOCUMENTS

| | | | |
|---|---|---|---|
| 2012/0226997 A1* | 9/2012 | Pang | H04L 12/1818 |
| | | | 715/753 |
| 2013/0176910 A1 | 7/2013 | Gorti et al. | |
| 2015/0332168 A1* | 11/2015 | Bhagwat | G06F 3/0481 |
| | | | 706/12 |
| 2015/0336578 A1* | 11/2015 | Lord | B60T 7/22 |
| | | | 701/2 |
| 2015/0358583 A1* | 12/2015 | Lee | H04L 12/1822 |
| | | | 348/14.08 |
| 2016/0255126 A1* | 9/2016 | Sarris | H04N 7/155 |
| | | | 348/14.08 |
| 2018/0260680 A1* | 9/2018 | Finkelstein | G10L 15/22 |
| 2018/0315429 A1* | 11/2018 | Taple | G06Q 50/18 |
| 2019/0324712 A1* | 10/2019 | Abuelsaad | H04M 3/569 |
| 2021/0280169 A1* | 9/2021 | Suzuki | G10L 15/063 |
| 2021/0359872 A1* | 11/2021 | Deole | H04L 65/403 |
| 2022/0092274 A1* | 3/2022 | Arivazhagan | G06F 40/47 |
| 2022/0299335 A1* | 9/2022 | Carbune | G10L 15/05 |

OTHER PUBLICATIONS

International Search Report and Written Opinion in Application No. PCT/US2021/056023, dated Feb. 11, 2022 (13 pages).

* cited by examiner

METHODS AND SYSTEMS FOR AUTOMATIC QUEUING IN CONFERENCE CALLS

TECHNICAL FIELD

Various embodiments of the present disclosure relate generally to methods and systems for automatically queuing participants during a conference call and, more particularly, to methods and systems for identifying conflicts during a conference call and automatically queuing one of the conflicting speakers to speak next.

BACKGROUND

During in-person conversations or meetings, participants generally have the ability to use non-verbal cues to moderate a discussion, avoid speaking at the same time, and allow those who have been waiting to speak to do so once it is their turn. These cues may include, for example, eye contact, changes to posture, and hand raising. While these methods of moderating a meeting can work well for in-person meetings, once those conversations are taking place in a virtual meeting space some of those cues become less reliable. Virtual meetings through videoconferencing or conference calls can not only lack the non-verbal cues present in in-person meetings, but there can also be lag that makes it even more difficult to take turns speaking without speaking over one another.

The present disclosure is directed to overcoming one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, methods and systems are disclosed for automatically queuing participants during a conference call. The methods and systems may moderate a conference call such that the participants take turns speaking, without concern for not having a turn to speak.

For instance, a method may include receiving call data associated with a conference call; analyzing the call data to identify a plurality of participants on the conference call; determining whether two or more participants of the plurality of participants are speaking at a same time; tracking a first participant that continues speaking and a second participant that stops speaking; and displaying a queuing element on a graphical user interface (GUI) associated with the conference call to indicate that the second participant is in a queue to speak after the first participant has finished.

A system may include a memory storing instructions; and a processor executing the instructions to perform a process. The process may include receiving call data associated with a conference call; analyzing the call data to identify a plurality of persons on the conference call; determining whether two or more persons of the plurality of persons are speaking at a same time; tracking a first person that continues speaking and a second person that stops speaking; and displaying a queuing element on a graphical user interface (GUI) associated with the conference call to indicate that the second person is in a queue to speak after the first person has finished.

A non-transitory computer-readable medium may store instructions that, when executed by a processor, cause the processor to perform a method. The method may include: receiving call data associated with a conference call; analyzing the call data to identify a plurality of participants on the conference call; determining whether two or more participants are speaking at a same time; tracking a first participant that continues speaking and a second participant that stops speaking; and displaying a queuing element on a graphical user interface (GUI) associated with the conference call to indicate that the second participant is in a queue to speak after the first participant has finished. The method may further include: determining when the first participant has stopped speaking by: extracting an audio portion of the call data; processing the audio portion to determine text by a speech-to-text function; processing the text to form text feature vectors; processing the text feature vectors though text analysis or topic modeling neural network models to determine an end of the first participant speaking or an end of a topic the first participant was discussing; muting audio input of devices of all participants other than the second participant; and displaying an indicator that it is the second participant's turn to speak.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to methods and systems for automatically queuing participants during a conference call.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In general, the present disclosure is directed to methods and systems for automatically detecting a conflict and placing a conference call participant in a queue. In particular, a system of the present disclosure may receive call data and identify participants. The system may then determine when multiple participants are attempting to speak at the same time, determine which of the participants yields, and placing the yielding participant in a queue to speak after the first participant.

Figure 1:
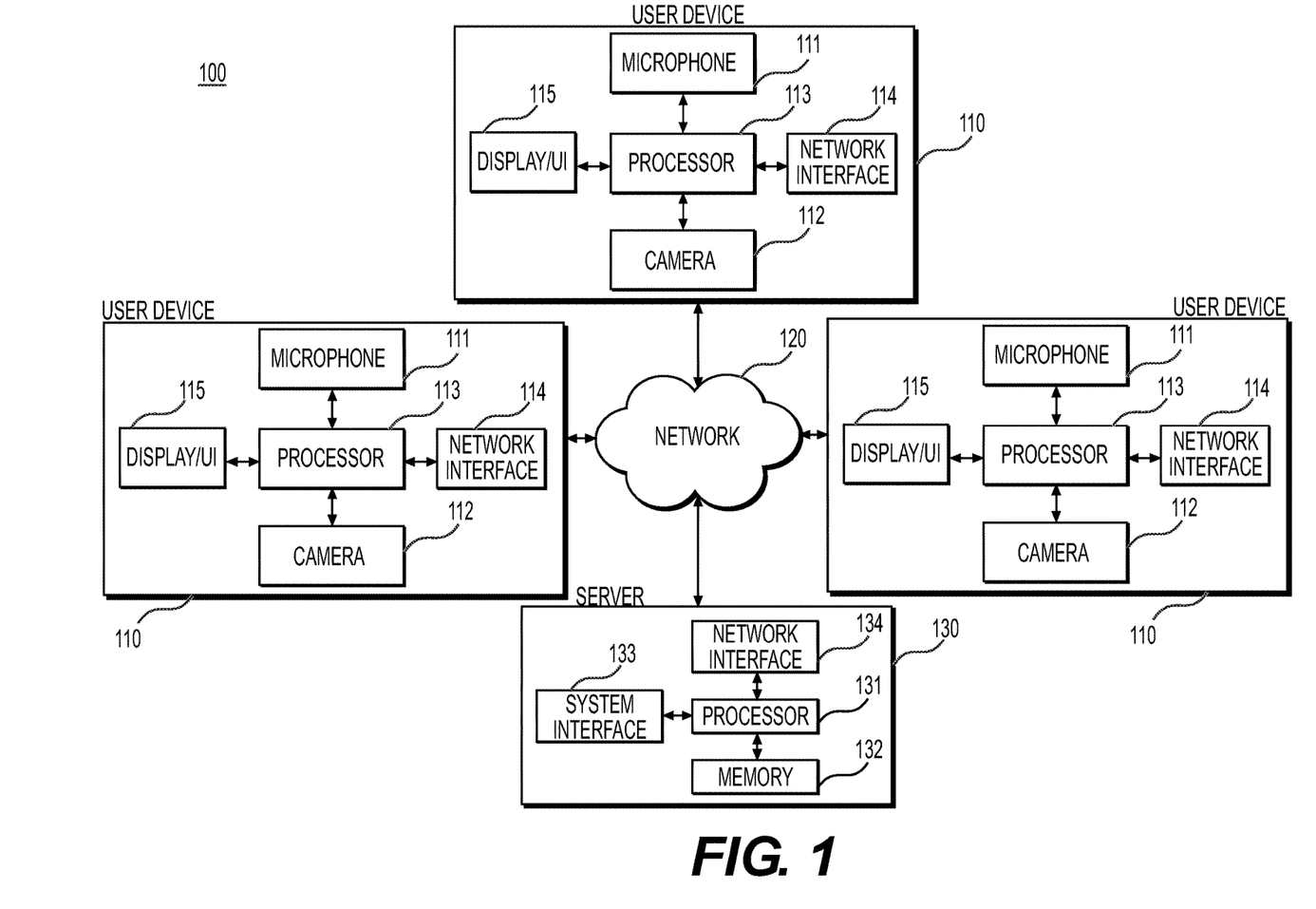
FIG. 1 depicts an exemplary block diagram of a system environment for automatic conference call queuing, according to one or more embodiments.

FIG. 1 depicts an exemplary block diagram of a system environment 100 according to one or more embodiments of the present disclosure. The system environment 100 may include two or more user devices 110. User devices 110 can be, for example, a computer, telephone, tablet, or other device that can allow a person to participate in a conference call or video conference call. User device 110 can include microphone 111, and for video conference calls, camera 112. Microphone 111 may be any suitable microphone type, and may include multiple microphones to collect additional sound information and enable call features such as noise cancelling and participant location. Camera 112 can be any suitable camera, and may include multiple cameras in order to capture images or video over large or separate spaces or to capture stereographic images and video. Depending on the type and amount of cameras employed by user device 110, information can be collected to enable conference call features such as participant tracking, eye tracking, high definition or 3-D displays, virtual backgrounding, and facial recognition.

User device 110 may further include one or more processors 113. Processor 113 can receive the data inputs from microphone 111 and camera 112 and relay the call data through network interface 114 via network 120 to system server 130. Network interface 114 can be selected to provide a proper connection between user device 110 and any other device in the system environment 100, and in some embodiments those connections may be secure connections using communication protocols suitable for the information being transmitted and received.

Each user device 110 can further include a display or user interface 115 in communication with processor 113 to provide the user or users of the device with system operating information and to allow users to provide user inputs to the system server 130 in order to control participation in the conference call. In some embodiments in accordance with the present disclosure, display or user interface 115 can include a monitor, touchscreen panel, keyboard, keypad, mouse, trackpad, or other suitable device for displaying information to the users of device 110 or for receiving inputs from users of device 110.

Network 120 may be implemented as, for example, the Internet, a wireless network, a wired network (e.g., Ethernet), a local area network (LAN), a Wide Area Network (WANs), Bluetooth, Near Field Communication (NFC), or any other type of network or combination of networks that provides communications between one or more components of the system environment 100. In some embodiments, the network 120 may be implemented using a suitable communication protocol or combination of protocols such as a wired or wireless Internet connection in combination with a cellular data network.

Server 130 may be provided to carry out one or more steps of the methods according to the present disclosure. Server 130 may include a processor 131 and a memory 132. Processor 131 may receive inputs via system interface 133, which may be an interface associated with the service provider for hosting the conference call. System interface 133 may be used to update the server 130 programming stored in memory 132 in order to provide different or additional functionality to the server 130. Processor 131 can be in communication with other elements of the system environment 100 via network interface 134. Network interface 134 may be a wired or wireless transmitter and receiver, and can also be implemented according to the present disclosure as a combination of wired and wireless connections.

Figure 2:
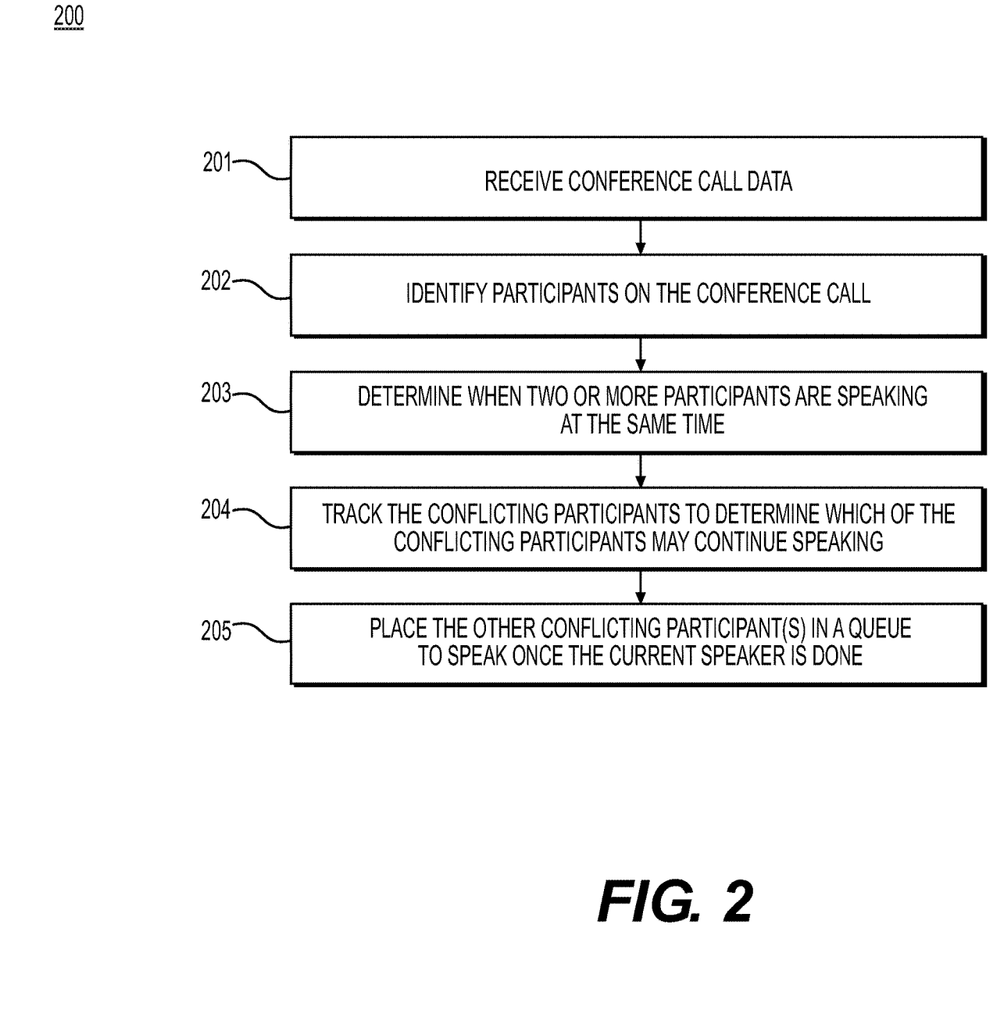
FIG. 2 depicts a flowchart of an exemplary method of automatic conference call queuing, according to one or more embodiments.

FIG. 2 depicts a flowchart illustrating a method 200 for automatic conference call queuing, according to one or more embodiments of the present disclosure. The method may be performed by a system in accordance with the present disclosure, including one or more of the devices that comprise the system environment 100.

Method 200 may begin at step 201 with the receipt of conference call data by server 130 from one or more user devices 110. The call data may include audio inputs, video inputs, user inputs from user interface 115, information about the number and types of devices connected to the conference call, participant locations, participant login data, user preferences, or any other data associated with one or more features of the conference call. Processor 131 of server 130 can process the call data in accordance with the programming stored in memory 132 to provide functionality associated with the method of the present disclosure as well as any other features associated with the conference call provider.

Once and/or as the call data is received, the system (e.g., server 130) can process the data at step 202 to identify the participants on the conference call. Processor 131 may extract relevant portions of the call data in order to provide an appropriate subset of the data for further processing. For example, if the call data includes video inputs or text-based chats associated with the call, processor 131 may extract the audio portion of the call data before proceeding with the analysis. By extracting different portions of the call data for different analyses to be performed, server 130 may be able to reduce the processing bandwidth and data transfer required to perform each analysis.

Figure 3:
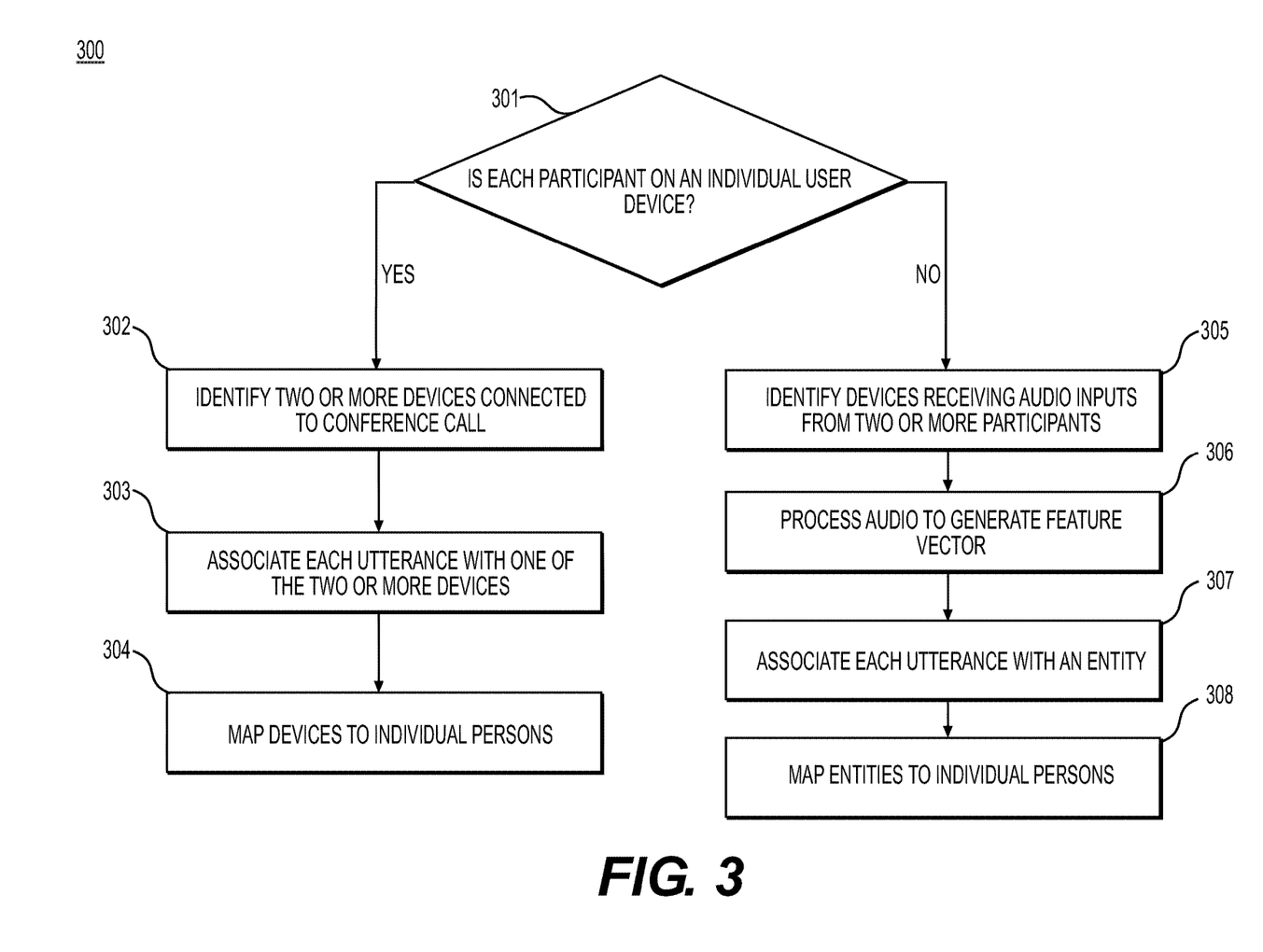
FIG. 3 depicts a flowchart for an exemplary method of identifying participants on a conference call, according to one or more embodiments.

The particular manner in which the server 130 identifies the participants on the conference call may vary depending on the composition of the call data. The identification of the participants on the conference call may be achieved in a number of suitable ways, and an example of step 202 in accordance with the present disclosure is depicted in FIG. 3.

Participant identification method 300 can begin at step 301 with an identification of any user devices 110 that have multiple participants. In some instances, each participant will be on their own individual user device 110. When the server 130 is able to determine that each participant is on their own device (step 301: Yes), at step 302, the server 130 can use the call data to identify the user devices 110 connected to the conference call. The server 130 can then associate each utterance/audio input with the device from which it originated at step 303. By parsing the call data in such a way, the server 130 can know which device is responsible for which utterances/audio inputs, and then at step 304, the server 130 can map each of the identified devices to an individual person using, for example, device login data, location data, caller I.D. information, facial recognition, or any combination thereof. The result is that each utterance or audio input is able to be associated not only with the device on which it originated, but also to a particular individual participant.

If the server 130 is either unable to determine that each participant is on their own user device 110 or is aware that one or more devices has multiple participants speaking into it (step 301: No), the process may proceed differently. While any user devices 110 that are determined to only have a single participant may proceed via steps 302-304, devices identified as receiving audio inputs from two or more participants at step 305 may proceed to step 306.

At step 306, processor 131 may extract the audio portion of the call data, and then process the audio associated with the multiple participant devices to extract features and generate a feature vector. The feature vector is created to represent the various utterances and audio inputs in a form suitable for analysis by, for example, a computer system, neural network, or other machine learning system. This feature vector may then be analyzed further at step 307 to associate each of the utterances with an entity that the server 130 has determined is a single voice or participant. Systems such as neural networks can be equipped to quickly recognize patterns in large data vectors, and may be able to provide the analysis of which utterances correspond with which entities in real time or with a minimal delay.

At this stage, the server 130 is able to map each utterance to the entity that made the particular utterance, forming a grouping of utterances likely to have come from the same individual. Then, at step 308, the server 130 can use appropriate available conference call data such as login data, facial recognition, voice recognition, user prompted inputs, or other suitable methods to associate the entities with individual persons. Either branch of method 300 can result in a mapping of audio inputs with individual participants in the conference call. The server 130 may then be able to determine which participant(s) are speaking at any given time.

Figure 4:
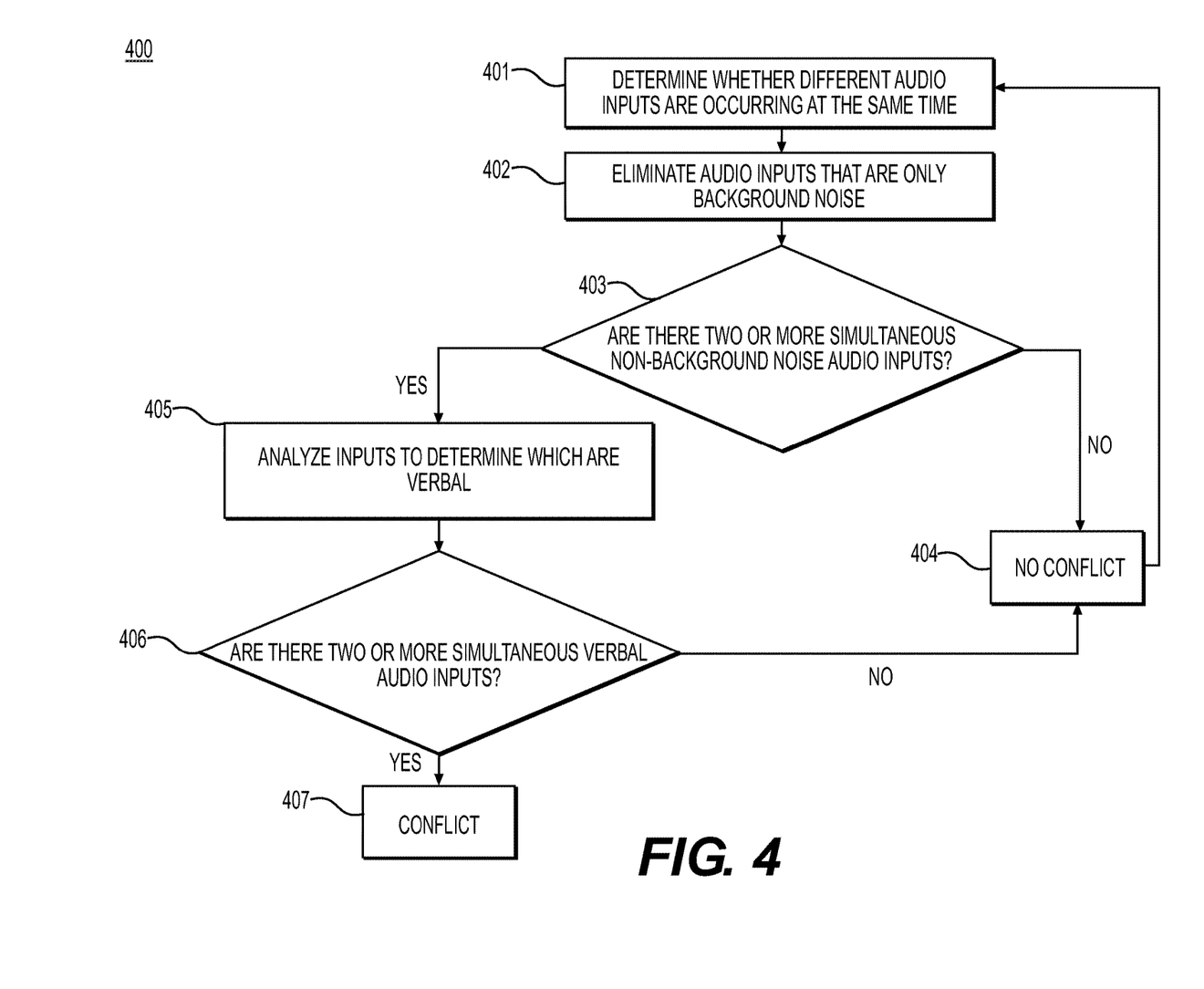
FIG. 4 depicts a flowchart for an exemplary method of determining when two or more participants are speaking at the same time, according to one or more embodiments.

Returning to FIG. 2, having identified the participants on the call, at step 203, the server 130 may process the call data to determine when two or more participants may be attempting to speak at the same time. An exemplary method of performing this conflict determination in accordance with the present disclosure is depicted in FIG. 4.

Conflict determination method 400 can begin by monitoring the audio inputs at step 401 such that once the server 130 determines that there are two or more entities, devices, or participants inputting audio into the conference call, the server 130 proceeds to step 402. Because some of the audio inputs may not be attempts by a participant to speak, the server 130 may analyze the individual audio inputs and ignore (e.g., eliminate) those that it determines to be background or ambient noise (e.g., barking dogs, children playing, passing sirens) as opposed to participant's voices. In some embodiments, this reduction of the active audio inputs to be analyzed may be a filter that is constantly monitoring all inputs, however because background noise may not be an issue for the conference call absent a conflict or potential conflict, it may be possible to reduce processing requirements by only scanning active audio inputs for background noise during a potential conflict.

At step 403, the server 130 may reanalyze the audio inputs and determine if there are still two or more entities, devices, or participants inputting audio into the conference call. If the server 130 determines that ignoring the background noise audio input have eliminated the conflict (step 403: No), then at step 404, the server 130 can determine there is no conflict and return to step 401 to continue monitoring for conflicts. Should there still be two or more simultaneous non-background noise audio inputs (step 403: Yes), as would be the case when two or more voices are detected simultaneously, the server 130 can proceed to step 405.

Step 405, like step 402, endeavors to ensure that a conflict is only identified when two participants are attempting to speak to the conference call participants at the same time. In step 402, the analysis was to eliminate background noise, however at step 405, the analysis seeks to determine if the audio input is a verbal utterance intended to be heard by the conference call participants or a non-verbal utterance or aside not intended for the call participants to hear. The server 130 may analyze the audio inputs and may ignore those that are, for example, not human speech (e.g., coughing, throat clearing, sneezing, sighing) or are whispers/asides not directed to the conference call participants. A number of aspects of the call data may inform this analysis, for example, the volume of the audio input or whether or not the participant is facing the camera.

Once these non-verbal (or non-relevant) audio inputs are eliminated, the server 130 can again determine whether there remain two or more active audio inputs of speech (step 406). As before, if there no longer is a conflict (step 406: No), the server 130 may proceed to block 404 and return to step 401 to continue monitoring for conflicts. In the event that a conflict remains, the server 130 may proceed to block 407, and determine that there is, in fact, a conflict between two identified participants as they attempt to speak at the same time.

Having determined that there is a conflict, the server 130 can proceed to step 204 and begin tracking the conflicting participants. In some embodiments, the server 130 may track the conflicting participants for a brief period, and note which has voluntarily yielded to the other. In addition to or in lieu of tracking the participants for a given period of time, the system may determine which of the conflicting participants shall be permitted to continue speaking, and to mute the other conflicting participant(s) in order to allow the permitted participant to continue uninterrupted. This determination may be made by, for example, responding to a user input from the call leader, referencing the institutional hierarchy, determining the participant most relevant to the particular topic, or simply making a random selection. Whether the conflicting participant voluntarily yielded or was not selected to speak at the time of the conflict, the server 130 can place the participant in a queue to speak once the current speaker is finished speaking at step 205.

Figure 5:
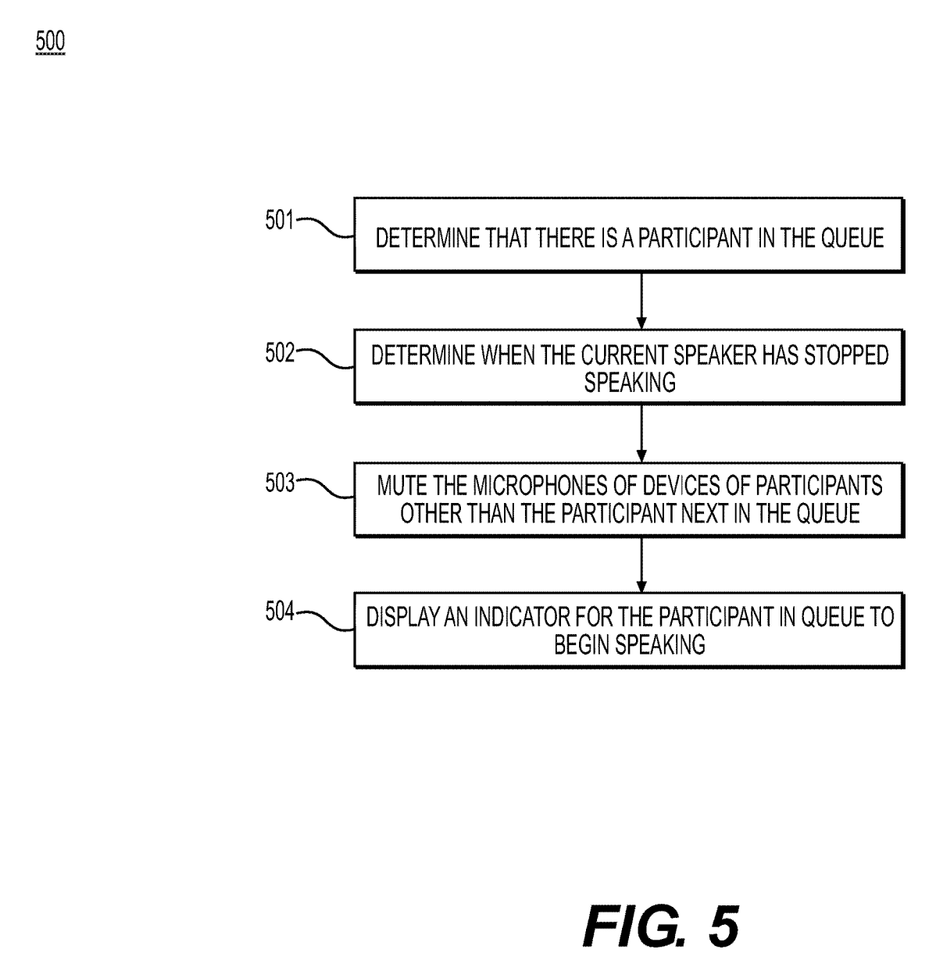
FIG. 5 depicts a flowchart for an exemplary method of placing a conference call participant in a queue, according to one or more embodiments.

Once a participant has been placed in the queue to speak, the server 130 can allow the participant to speak at the next appropriate time. An exemplary method of enabling a queued participant to speak in accordance with the present disclosure is depicted in FIG. 5. Method 500 for progressing through a queue of participants can begin at step 501 with a determination that a participant was placed into the conference call queue at step 205. When the server 130 determines a participant is in the queue, at step 502, the server 130 can monitor the call data to determine when the current speaker has stopped speaking. In some embodiments, the current speaker may also be stopped by an input from the conference call leader.

In some applications, the server 130 may also determine that a participant has finished speaking when the server 130 determines the speaking participant has changed topics. Some systems in accordance with the present disclosure may determine that a participant has changed topics by processing the call audio to determine text by a speech-to-text function. This text may be further processed to form text feature vectors suitable for analysis, and then the text feature vectors may be put through text analysis or topic modeling neural network models to determine an end of the current participant's speaking or an end of a topic the participant was discussing. This analysis may, for example, rely on keywords detected in the text feature vector to determine what topic or topics the speaker is discussing. Keywords may be identified by a neural network, entered into the server 130 by the call leader, recognized from meeting agendas or visual presentations (e.g., PowerPoint), or determined via another suitable method. Once the server 130 detects or fails to detect certain keywords, it may be able to determine a shift in topic or a natural stopping point to transition from one speaker to another.

Once the server 130 has determined that the current speaker has concluded (or for some other reason it should be another participant's turn), at step 503, the server 130 may mute the microphones of the user devices 110 not associated with the next participant in the queue. Then, at step 504, the server 130 may prompt the queued participant by displaying an indicator on user interface 115 that it is that particular participant's turn to speak.

Figure 6A:
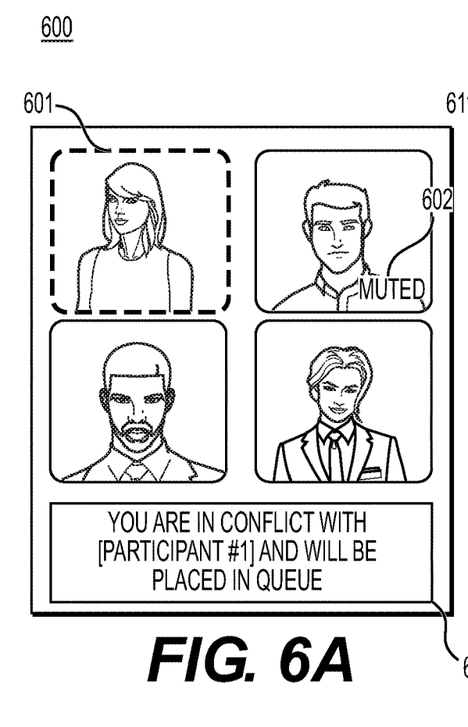
FIGS. 6A-6C depict exemplary user interfaces that may provide prompts to a user on a user device, according to one or more embodiments.
Figure 6B:
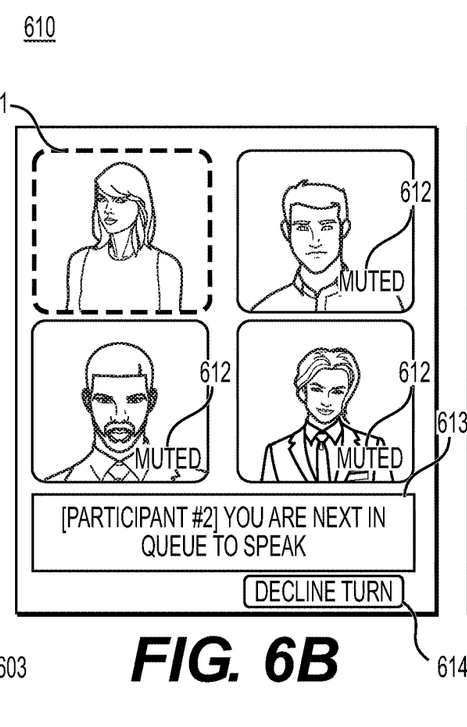
Figure 6C:
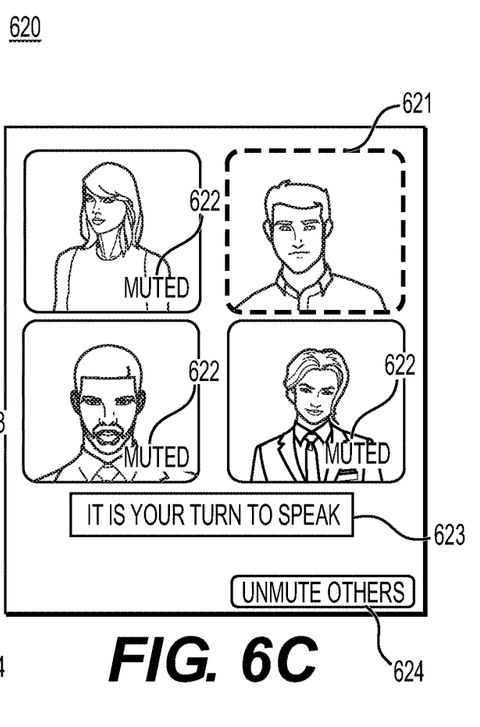

FIGS. 6A-6C illustrate exemplary graphical user interfaces (GUIs) 600, 610, 620 that may be displayed on user devices 110. GUIs 600, 610, 620 may, for example, allow the conference call participants to be notified of a conflict, notified of their position in the queue to speak, and prompted when it is the participant's turn to speak. GUI 600 may represent an exemplary user interface that a participant may see when they are in conflict with another participant and are not being permitted to continue speaking. Element 601 may indicate the participant who is being permitted to speak at a given time, and element 602 may indicate which other participants have been placed on mute. Element 603 may be a message that alerts a particular participant of the conflict, as well as the fact that they are being placed in a queue to speak at a later time should they so desire.

After being notified of the conflict, GUI 610 may represent an exemplary user interface that a participant may see when they are in the conference call queue to speak next. Element 611 may continue to indicate that another participant is being permitted to speak, while elements 612 may indicate that all other participants have been placed on mute. Element 613 may be a queuing element that alerts the queued participant that they are in the queue as well as their position within the queue. Because it is possible that a queued participant may no longer want to speak, element 614 can be provided as an opt-out button for the user to select on their user interface. Selecting opt-out element 614 can notify the server 130 that the queued participant would like to be removed from the queue, and the server 130 can then remove them from the conference call queue.

Once the server 130 has determined that it is the end of a participant's turn to speak, GUI 620 may represent an exemplary user interface that a queued participant may see when it has become their turn to speak. Element 621 may now indicate that it is the new participant's turn to speak, and elements 622 may indicate that the other participants have been muted to permit the previously queued participant to take their turn to speak. Element 623 can be used to notify the participant that it is their turn to speak, while element 624 may be a button on the user interface that, when selected, can end that speaker's turn. Upon the end of the speaker's turn, the server 130 can indicate that that speaker's turn has ended, and can, for example, proceed to the next queued participant, or unmute the other call participants.

A system in accordance with the present disclosure, in executing the methods 200, 300, 400, and 500 as discussed above, may provide additional functionality for conducting and moderating a conference call. The server 130 may automatically place call participants into a queue and in doing so may not only reduce or eliminate conflicts of speakers, but may also ensure that contributions from other participants are not lost as a result of such conflicts. This may result in a more clear discussion flow, while still allowing for participation by multiple speakers.

Figure 7:
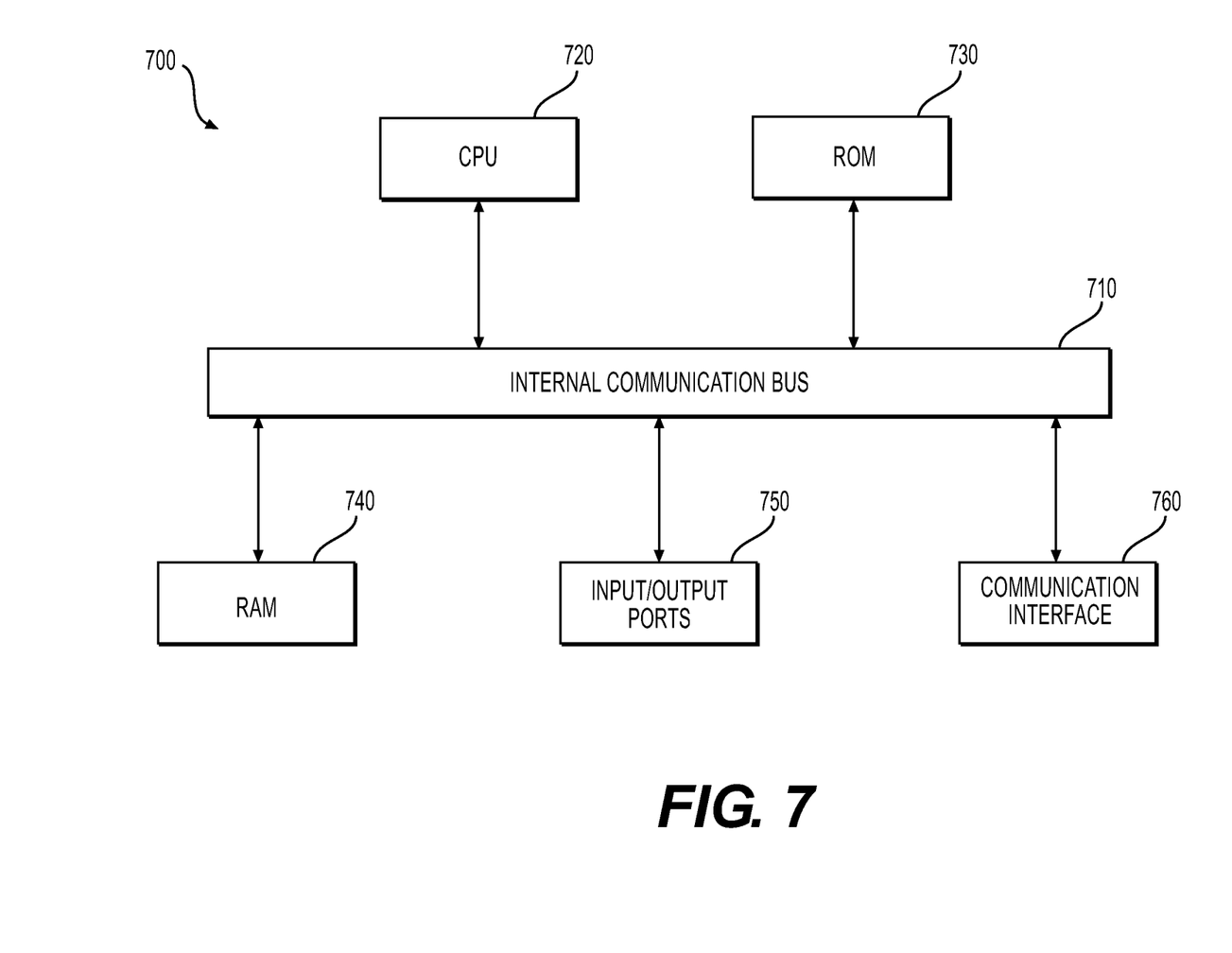
FIG. 7 depicts an example system that may execute techniques presented herein.

FIG. 7 depicts an example system that may execute techniques presented herein. FIG. 7 is a simplified functional block diagram of a computer that may be configured to execute techniques described herein, according to exemplary embodiments of the present disclosure. Specifically, the computer (or "platform" as it may not be a single physical computer infrastructure) may include a data communication interface 760 for packet data communication. The platform may also include a central processing unit (CPU) 720, in the form of one or more processors, for executing program instructions. The platform may include an internal communication bus 710, and the platform may also include a program storage and/or a data storage for various data files to be processed and/or communicated by the platform such as ROM 730 and RAM 740, although the system 700 may receive programming and data via network communications. The system 700 also may include input and output ports 750 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method, the computer-implemented method comprising:
    receiving call data associated with a conference call;
    analyzing the call data to identify a plurality of participants on the conference call and a call topic;
    determining whether two or more participants of the plurality of participants are speaking at a same time;
    based upon a determination that the two or more participants are speaking at the same time, tracking the two or more participants to identify a first participant that continues speaking and a second participant that voluntarily yields to the first participant;
    determining that the yielding second participant is more relevant to the call topic than the first participant;
    muting the first participant based on determining that the yielding second participant is more relevant to the call topic;
    displaying a queuing element on a graphical user interface (GUI) associated with the conference call to indicate the two or more participants are speaking at the same time and that the first participant is in a queue to speak after the second participant has finished;
    determining when the second participant has stopped speaking by:
        extracting an audio portion of the call data;
        processing the audio portion to determine text by a speech-to-text function;
        processing the text to form text feature vectors; and
        determining the second participant shifted from the first call topic to a second call topic based on one or more topic modeling neural network models;
    muting audio input of devices of all participants other than the first participant; and
    displaying an indicator that it is the first participant's turn to speak.

2. The computer-implemented method of claim 1, wherein analyzing the call data to identify a plurality of participants on the conference call includes:
    extracting a second audio portion of the call data;
    processing the second audio portion to form a second feature vector;
    processing the second feature vector through the one or more topic modeling neural network models to map utterances to one or more entities; and
    mapping the one or more entities to the plurality of participants.

3. The computer-implemented method of claim 1, wherein analyzing the call data to identify a plurality of participants on the conference call includes:
    identifying one or more devices connected to the conference call;
    extracting a second audio portion of the call data;
    processing the second audio portion to associate utterances to the one or more devices; and mapping the one or more devices to the plurality of participants.

4. The computer-implemented method of claim 1, wherein the GUI, as displayed on a device associated with the first participant, includes an opt-out element that when selected by a user input removes the first participant from the queue.

5. The computer-implemented method of claim 1, wherein determining when the second participant has stopped speaking includes:
determining whether the text includes keywords; and
based upon a determination that the text includes the keywords, determining the second participant has stopped speaking.

6. The computer-implemented method of claim 1, wherein determining whether the two or more participants are speaking at the same time includes:
determining whether different audio inputs from different devices are input at the same time or determining that there are two or more voices being input at the same time; and
based upon a determination that the different audio inputs are input from the different devices at the same time or that there are two or more voices being input at the same time, determining two or more participants are speaking at the same time.

7. The computer-implemented method of claim 6, wherein determining whether two or more participants are speaking at the same time further includes, before determining the two or more participants are speaking at the same time:
determining whether an audio input of the different audio inputs is a background noise; and
based on a determination that the audio input of the different audio inputs is not background noise, determining two or more participants are speaking at the same time.

8. The computer-implemented method of claim 6, wherein determining whether two or more participants are speaking at the same time further includes, before determining two or more participants are speaking at the same time:
determining whether a voice of the two or more voices is a non-verbal utterance; and
based on a determination that the voice is not a non-verbal utterance, determining two or more participants are speaking at the same time.

9. The computer-implemented method of claim 1, wherein the received call data includes predetermined words; and
determining that the yielding second participant is more relevant to the call topic than the first participant includes comparing the speaking of the first and second participant to the predetermined words.

10. The computer-implemented method of claim 1, wherein determining the second participant shifted from the first call topic to a second call topic is based on determining a transition point based on the one or more topic modeling neural network models.

11. A system, the system comprising:
a memory storing instructions; and
a processor executing the instructions to perform a process including:
receiving call data associated with a conference call;
analyzing the call data to identify a plurality of persons on the conference call and a call topic;
determining whether two or more persons of the plurality of persons are speaking at a same time;
based upon a determination that the two or more persons are speaking at the same time, tracking the two or more persons to identify a first person that continues speaking and a second person that voluntarily yields to the first person;
determining that the yielding second person is more relevant to the call topic than the first person;
muting the first person based on determining that the yielding second person is more relevant to the call topic;
displaying a queuing element on a graphical user interface (GUI) associated with the conference call to indicate the two or more persons are speaking at the same time and that the first person is in a queue to speak after the second person has finished;
determining when the second person has stopped speaking by:
extracting an audio portion of the call data;
processing the audio portion to determine text by a speech-to-text function:
processing the text to form text feature vectors; and
determining the second person shifted from the first call topic to a second call topic based on one or more topic modeling neural network models;
muting audio input of devices of all participants other than the first person; and
displaying an indicator that it is the first person's turn to speak.

12. The system of claim 11, wherein analyzing the call data to identify a plurality of persons on the conference call includes:
extracting a second audio portion of the call data;
processing the second audio portion to form a second feature vector;
processing the second feature vector through the one or more topic modeling neural network models to map utterances to one or more entities; and
mapping the one or more entities to the plurality of persons.

13. The system of claim 11, wherein the process further includes, for analyzing the call data to identify a plurality of persons on the conference call:
identifying one or more devices connected to the conference call;
extracting a second audio portion of the call data;
processing the second audio portion to associate utterances to the one or more devices; and
mapping the one or more devices to the plurality of persons.

14. The system of claim 11, wherein the GUI, as displayed on a device associated with the first person, includes an opt-out element that when selected by a user input removes the first person from the queue.

15. The system of claim 11, wherein determining when the second person has stopped speaking includes:
determining whether the text includes keywords; and
based upon a determination that the text includes the keywords, determining the second person has stopped speaking.

16. The system of claim 11, wherein determining whether the two or more persons are speaking at the same time includes:
determining whether different audio inputs from different devices are input at the same time or determining that there are two or more voices being input at the same time; and based upon a determination that the different audio inputs are input from the different devices at the same time or that there are two or more voices being input at the same time, determining two or more persons are speaking at the same time.

17. The system of claim 16, wherein determining whether two or more persons are speaking at the same time further includes, before determining two or more persons are speaking at the same time:
- determining whether an audio input of the different audio inputs is a background noise; and
- based on a determination that the audio input of the different audio inputs is not background noise, determining the two or more persons are speaking at the same time.

18. The system of claim 11, wherein the received call data includes predetermined words; and
- determining that the yielding second person is more relevant to the call topic than the first person includes comparing the speaking of the first and second person to the predetermined words.

19. The system of claim 11, wherein the determining the second person shifted from the first call topic to a second call topic is based on determining a transition point based on the one or more topic modeling neural network models.

20. A non-transitory computer-readable medium storing instructions that, when executed by a processor, cause the processor to perform a method, the method comprising:
- receiving call data associated with a conference call;
- analyzing the call data to identify a plurality of participants on the conference call and a call topic;
- determining whether two or more participants are speaking at a same time;
- based upon a determination that the two or more participants are speaking at the same time, tracking the two or more participants to identify a first participant that continues speaking and a second participant that voluntarily yields to the first participant;
- determining that the yielding second participant is more relevant to the call topic than the first participant;
- muting the first participant based on determining that the yielding second participant is more relevant to the call topic;
- displaying a queuing element on a graphical user interface (GUI) associated with the conference call to indicate the two or more participants are speaking at the same time and that the first participant is in a queue to speak after the second participant has finished;
- determining when the second participant has stopped speaking by:
  - extracting an audio portion of the call data;
  - processing the audio portion to determine text by a speech-to-text function;
  - processing the text to form text feature vectors; and
  - determining the second participant shifted from the first call topic to a second call topic based on one or more topic modeling neural network models;
- muting audio input of devices of all participants other than the first participant; and
- displaying an indicator that it is the first participant's turn to speak.

* * * * *